(12) United States Patent
Daraskavich et al.

(10) Patent No.: US 10,335,653 B1
(45) Date of Patent: Jul. 2, 2019

(54) METHOD OF MANUFACTURING GOLF CLUB HEADS

(71) Applicant: Callaway Golf Company, Carlsbad, CA (US)

(72) Inventors: Matthew R. Daraskavich, Carlsbad, CA (US); Joshua D. Westrum, San Diego, CA (US); Scott Manwaring, Carlsbad, CA (US); Kenneth E. Meacham, Hemet, CA (US); Catherine L. Ingbar, Encinitas, CA (US); Justin Kuhar, San Diego, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 15/950,789

(22) Filed: Apr. 11, 2018

(51) Int. Cl.
| | |
|---|---|
| *A63B 53/08* | (2015.01) |
| *A63B 53/04* | (2015.01) |
| *B23K 11/00* | (2006.01) |
| *B22F 3/22* | (2006.01) |
| *B22F 1/00* | (2006.01) |

(52) U.S. Cl.
CPC .......... *A63B 53/047* (2013.01); *B22F 1/0077* (2013.01); *B22F 3/225* (2013.01); *B23K 11/0026* (2013.01); *A63B 53/08* (2013.01); *A63B 2053/042* (2013.01); *A63B 2053/0433* (2013.01); *A63B 2053/0491* (2013.01); *B22F 2998/10* (2013.01)

(58) Field of Classification Search
CPC ... A63B 53/047; A63B 53/0475; A63B 53/08; A63B 2053/0416; A63B 2053/042; A63B 2053/0425; A63B 2053/0429; A63B 2053/0491

USPC ............... 473/350, 335, 337, 341, 342, 349
See application file for complete search history.

(56) References Cited

U.S. PATENT DOCUMENTS

| | | | |
|---|---|---|---|
| 4,343,980 A * | 8/1982 | Stanya | B23K 11/25 219/109 |
| 7,936,296 B2 | 5/2011 | Kibune et al. | |
| 7,946,929 B2 | 5/2011 | Wahlin et al. | |
| 8,353,785 B2 | 1/2013 | Ines et al. | |
| 8,512,164 B2 | 8/2013 | Ines et al. | |
| 2002/0082117 A1* | 6/2002 | Nishitani | A63B 53/04 473/345 |
| 2010/0234132 A1* | 9/2010 | Hirsch | A63B 53/04 473/340 |
| 2012/0149493 A1 | 6/2012 | Seluga et al. | |
| 2013/0324280 A1* | 12/2013 | Boyd | A63B 53/047 473/290 |
| 2016/0287955 A1* | 10/2016 | Ritchie | A63B 53/047 |
| 2017/0340932 A1* | 11/2017 | Morales | A63B 53/0475 |

* cited by examiner

*Primary Examiner* — Benjamin Layno
(74) *Attorney, Agent, or Firm* — Rebecca Hanovice; Michael Catania; Sonia Lari

(57) ABSTRACT

A golf club head comprising at least one part manufactured via a metal injection molding process, and attached to another part of the golf club head via electrical resistance welding, is disclosed herein. The present invention is also directed to a method of making said golf club head, the method comprising the steps of providing a first golf club head part made from a first metal material, metal injection molding a second golf club head part from a second, different metal material, and electrical resistance welding the second golf club head part to the first golf club head part to form a combined part.

4 Claims, 10 Drawing Sheets

METHOD OF MANUFACTURING GOLF CLUB HEADS

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

Field of the Invention

The present invention relates to a method of manufacturing one or more portions of a golf club head via metal injection molding and electrical resistance welding processes. In particular, the present invention relates to metal injection molded face cups and weights for golf club heads, and bonding components of the golf club heads together using electrical resistance welding.

Description of the Related Art

Prior art iron-type golf club head parts, particularly faces, are made by investment casting or machining sheet metal to specification. These processes are time consuming, have significant design constraints, and can be cost-prohibitive for manufacturers. For example, investment casting a part for a golf club head requires the part to have minimum wall thicknesses, transitions, undercuts, and draft angles; the processing time for investment casting is also lengthy, limiting the production capacity of a manufacturer. Similarly, machining parts from sheet metal requires significant time and produces unwanted waste, as excess material must be removed from the part under manufacture.

If a manufacturer wishes to use different materials for different parts of the golf club head (e.g., a titanium alloy face with a stainless steel body), the waste produced, and the complexity of building the club head, increases. Prior art multi-material iron heads with multiple metal components (e.g., face, body, and internal weighting) are joined using traditional welding processes such as tig welding, plasma welding, and laser welding. Each of these welding processes produces a weld bead of varying size and consumes weld rods to join the components. A traditional player's iron chassis, especially in the short irons, is compact, with thin sole widths and thin topline thicknesses. Due to the size constraints of the chassis, multi-material constructions are challenging in a player's iron head shape because traditional welding processes require slightly larger head shapes or post weld machining to join all of the components in a small compact shape.

There is therefore a need for relatively quick and efficient processes of manufacturing and bonding metal golf club parts to allow for intricate thickness patterns and secure bonding, reduce the overall time of production, and minimize material waste.

BRIEF SUMMARY OF THE INVENTION

One aspect of the present invention is a method of manufacturing a face component for a golf club head, and particularly iron-type golf club heads, using metal injection molding. This process overcomes existing constraints and allows for multi-material designs, thin wall and hinges, and radical variable face thickness patterns.

Another aspect of the present invention is a method of manufacturing a face component for a golf club head by co-injection molding a titanium alloy substructure to increase coefficient of restitution (COR) while maintaining the COR at the geometric face center.

Yet another aspect of the present invention is electrical resistance one or more metal pieces together to form at least a portion of a golf club head.

Another aspect of the present invention is method comprising the steps of providing a first golf club head part, the first golf club head part comprising a first metal material, metal injection molding a second golf club head part from a second metal material, and electrical resistance welding the second golf club head part to the first golf club head part to form a combined part, wherein the second metal material is different from the first metal material. In some embodiments, the step of providing a first golf club head part may comprise casting an iron-type golf club head body. In other embodiments, each of the first and second metal materials may be selected from the group consisting of steel and titanium alloy. In still other embodiments, the first golf club head part may be a face component comprising a striking surface and a rear surface opposite the striking surface, and the second golf club head part may be a plate. In a further embodiment, the plate may have a thickness of no more than 0.10 inch and a mass of 10-25 grams, and wherein the second metal material may have a density of at least 16 g/cc. In another, further embodiment, the step of electrical resistance welding the second golf club head part to the first golf club head part may comprise the steps of placing the plate on a designated section of the rear surface and electrical resistance welding at least four different regions of the plate. In a further embodiment, the designated section may be a recessed area having approximately the same shape and size as the plate. In an alternative embodiment, the step of electrical resistance welding may comprise applying power for approximately one second to each of the at least four different regions of the plate. In another embodiment, the method may further comprise the step of tack welding the second golf club head part to the first golf club head part before the step of electrical resistance welding the second golf club head part to the first golf club head part. In yet another embodiment, the method may further comprise the step of finishing the combined part.

Another aspect of the present invention is a method comprising the steps of providing an electrical resistance welder comprising a pair of electrodes, placing between the pair of electrodes a golf club head comprising a first piece composed of a metal material and a second piece composed of a metal material, wherein the first piece is at least partially disconnected from a second piece, applying power to a plurality of regions of the golf club head so that at least one weld bead forms between the first and second pieces, removing the golf club head from the electrical resistance welder, and finishing the golf club head. In some embodiments, the step of finishing the golf club head may comprise the step of covering the weld bead. In another embodiment, the method may further comprise the step of metal injection molding at least one of the first piece and the second piece, which step may occur before the step of placing between the pair of electrodes the golf club head comprising the first piece and the second piece. In yet another embodiment, wherein the step of metal injection molding at least one of the first piece and the second piece may comprise co-injection molding two different metal alloys.

Yet another aspect of the present invention is an iron-type golf club head comprising a body comprising a top line, a sole, a heel side, a toe side, a hosel, and a face opening, and a metal injection molded face component comprising a striking face with a geometric center, a rear surface opposite the striking face, a plurality of scorelines extending across the striking face, an upper extension portion, a side extension portion, and a sole extension portion, wherein the face component is permanently affixed to the body to cover the face opening via a process selected from the group consisting of tig welding, plasma welding, laser welding and electrical resistance welding, and wherein the plurality of scorelines are integrally formed with the face component during metal injection molding. In some embodiments, the iron-type golf club head may further comprise a substructure co-injection molded with the face component, the face component may be composed of a first metal material, and the substructure may be composed of a second metal material having a different density than the first metal material. In a further embodiment, the first metal material may be steel, and the second metal material may be selected from the group consisting of tungsten alloy and titanium alloy. In other embodiments, the substructure may be a structure selected from the group consisting of a lattice, at least one solid, approximately rectangular wall, and a circular wall. In yet another embodiment, the iron-type golf club head may further comprise a sole weight co-injection molded from a steel material and a tungsten alloy material, and the sole weight may be permanently affixed to the sole portion by a process selected from the group consisting of tig welding, plasma welding, laser welding, and electrical resistance welding. In any of these embodiments, the striking face may have a maximum COR measurement at the geometric center.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
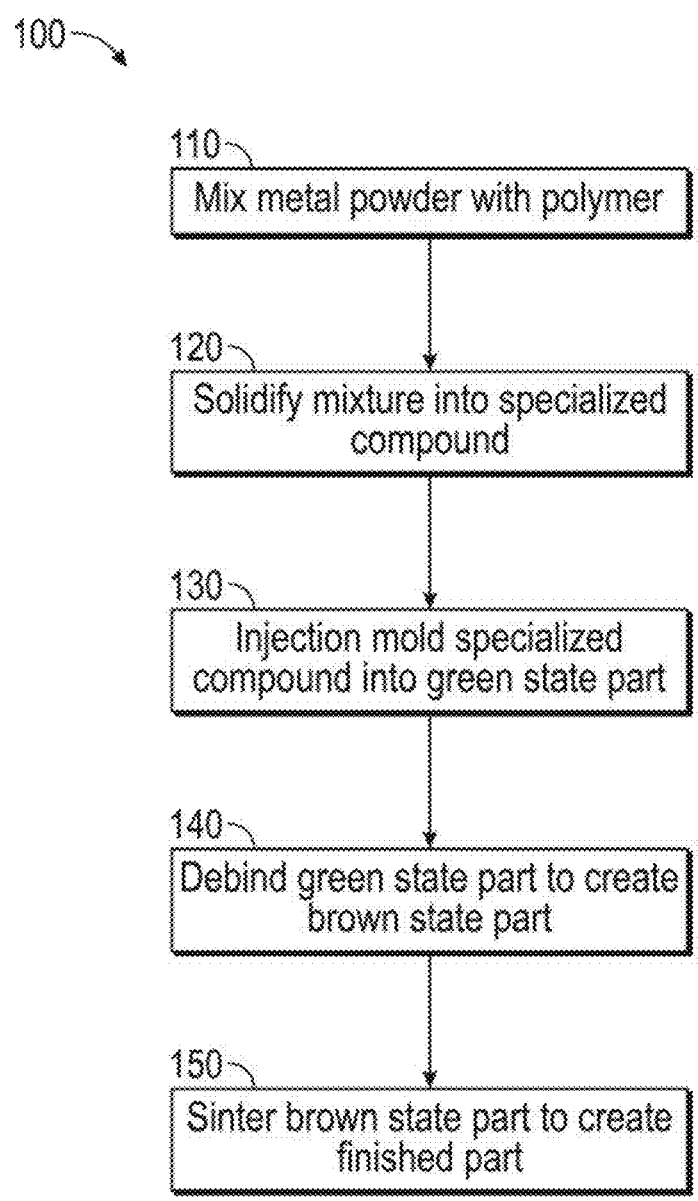
FIG. 1 is a flow chart describing a preferred metal injection molding method according to the present invention.

The present invention is directed to use of the metal injection molding (MIM) process illustrated in FIG. 1 to manufacture one or more pieces of a golf club head. First, a metal powder is mixed with a polymer, which is used as a carrier and binding agent 110; this mixture is then solidified to create a specialized compound 120. The specialized compound is then processed through an injection-molding machine into an injection mold to create the desired part, which is commonly referred to as a "green state" part 130. The green state part is placed in a debinding oven to melt out most of the polymer, leaving just enough polymer to hold the metal particles together 140; this product is commonly referred to as a "brown state" part. In the final step, the brown state part is sintered in a vacuum oven 150. The sintering process removes the remaining polymer material from the part and fuses the metal together through a heat treatment process, resulting in a finished part. The part will typically shrink by approximately 20% during the sintering step 150.

When MIM is used to manufacture one or more golf club head parts (e.g., face components, weights, reinforcement plates), the process increases the production rate of the part, thereby reducing the unit cost of the part and the club head as a whole. The MIM process also allows for high-throughput manufacture of parts with more intricate thickness patterns and inner/outer mold line designs than existing golf club head parts, which improves the overall performance of the part. This is particularly helpful when manufacturing face components 30 and other portions of iron-type golf club heads 10, such as the exemplary iron golf club head disclosed in FIG. 2, as there is less space within an iron head in which to distribute the available mass, and process constraints limit the extent to which complicated thickness patterns can be refined in prior art manufacturing processes like casting or forging.

Figure 2:
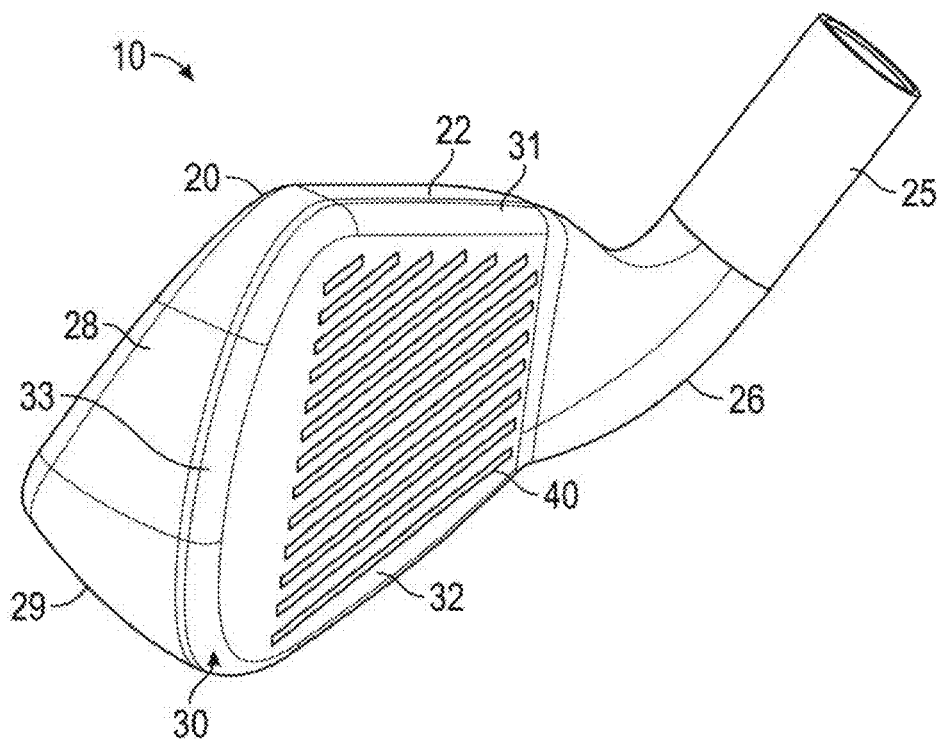
FIG. 2 is a side perspective view of an iron-type golf club head of the present invention.
Figure 3:
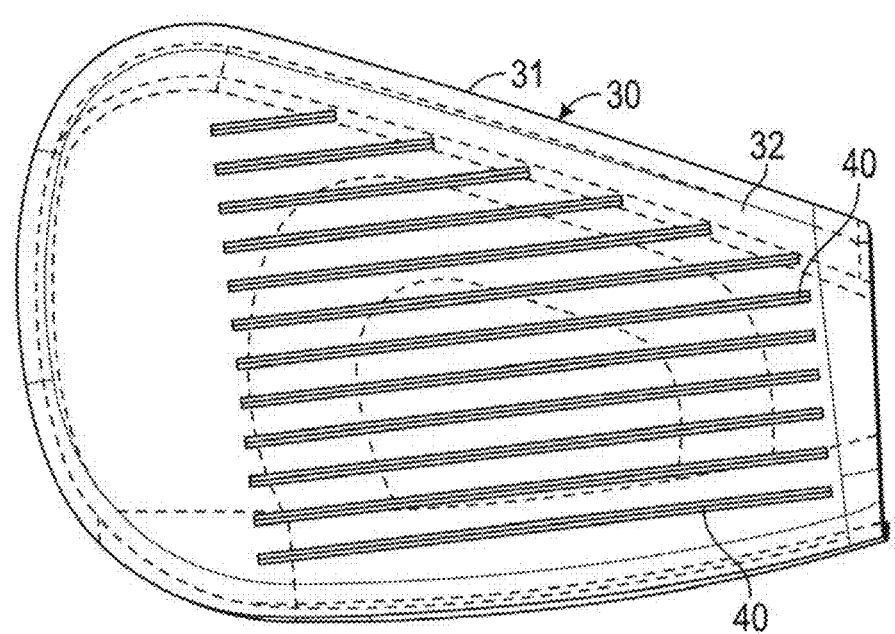
FIG. 3 is a front elevational view of the face component shown in FIG. 2.
Figure 4:
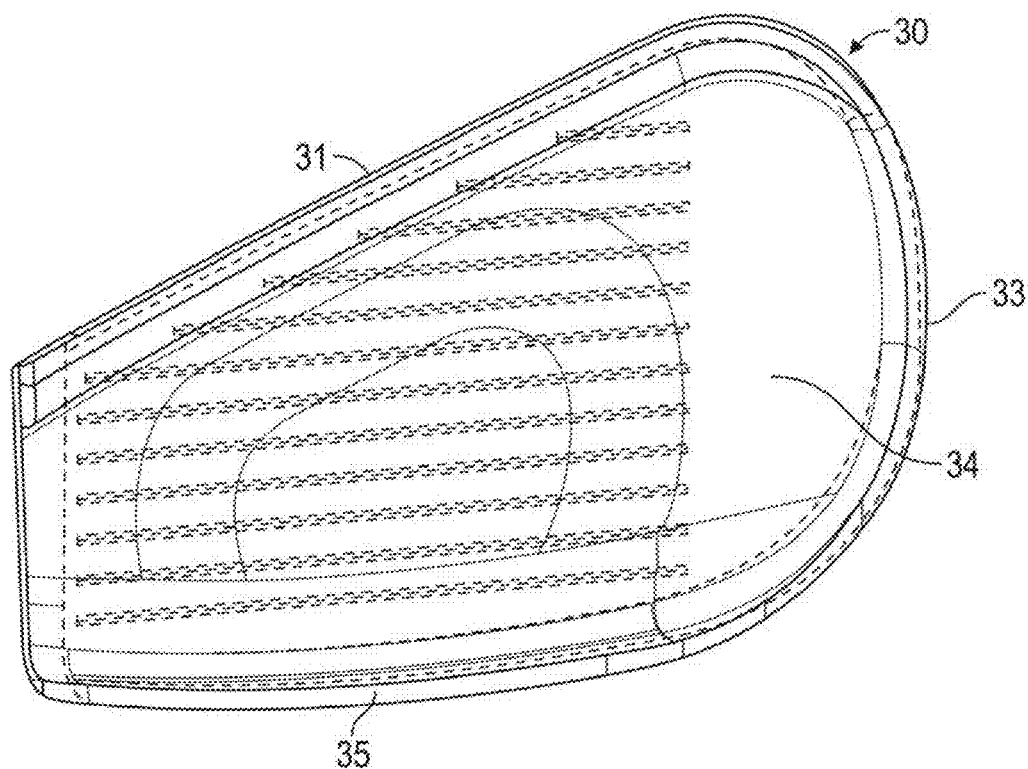
FIG. 4 is a rear elevational view of the face component shown in FIG. 3.

Some examples of face components manufactured via MIM are shown in FIGS. 2-4. In this preferred embodiment, the face component 30 is a face cup having a striking face 32 with scorelines 40 and a rear surface 34 opposite the striking face. The face component 30 also includes an upper extension portion 31, a side extension portion 33, and a sole extension portion 35, all extending away from the striking face 32. The scorelines 40 are preferably formed during the MIM process instead of being added by a separate process (e.g., machining, laser cutting, spin-milling) after the part is completed. The face component 30 is permanently affixed to a body 20 comprising a top line 22, a sole 24, a heel side 26 with a hosel 25, a toe side 28 opposite the heel side 26, and an opening (not shown) sized to be covered by the face component.

Figure 5:
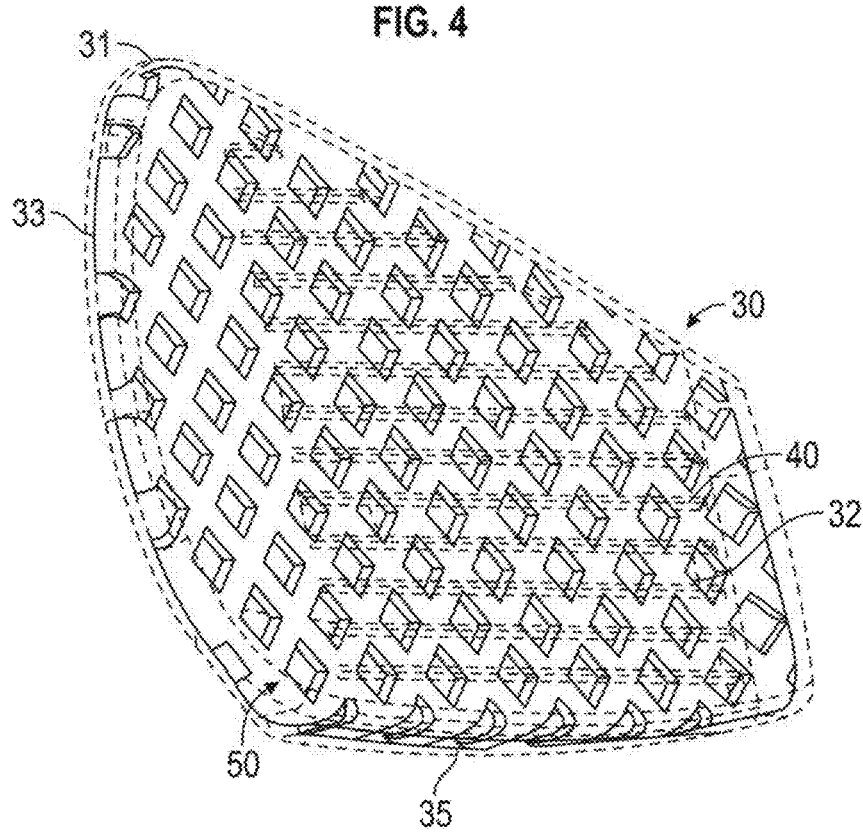
FIGS. 5-8 are side perspective views of alternative embodiments of the face component manufactured according to MIM co-molding methods of the present invention.
Figure 6:
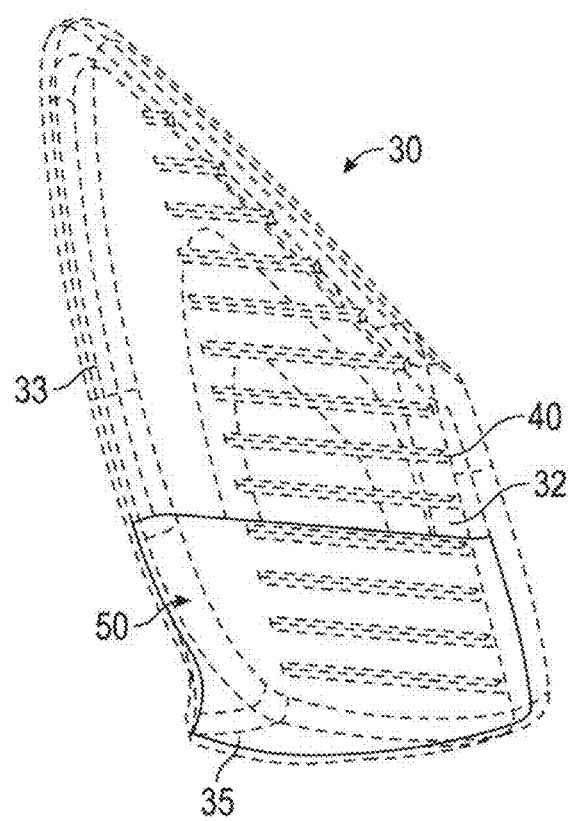
Figure 7:
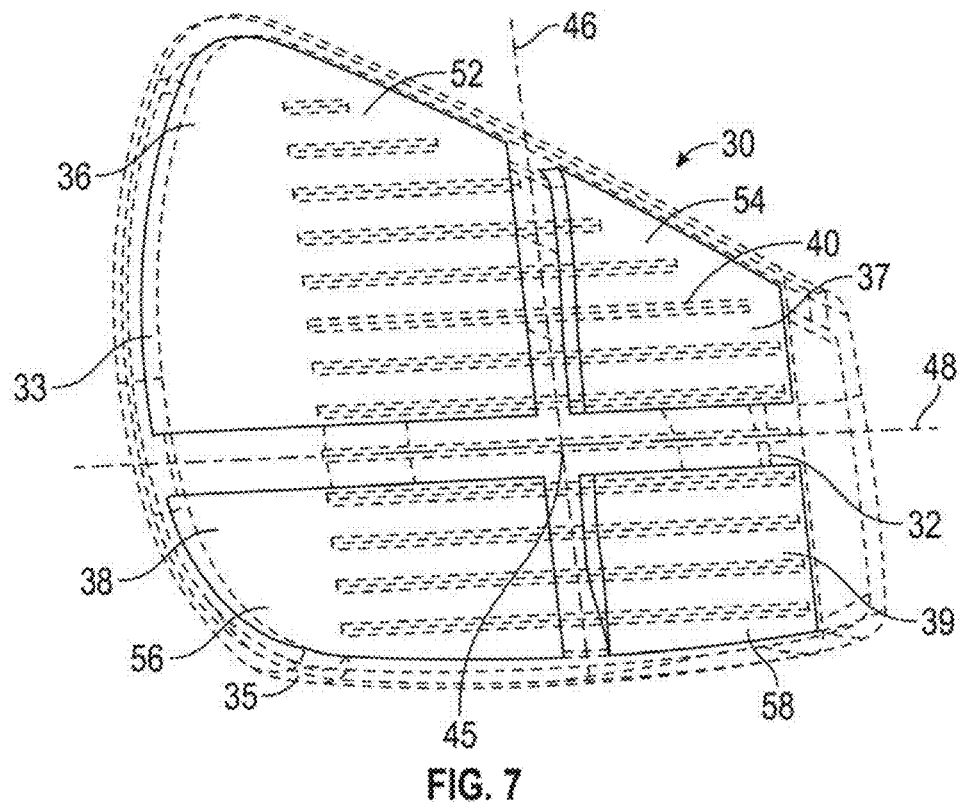
Figure 8:
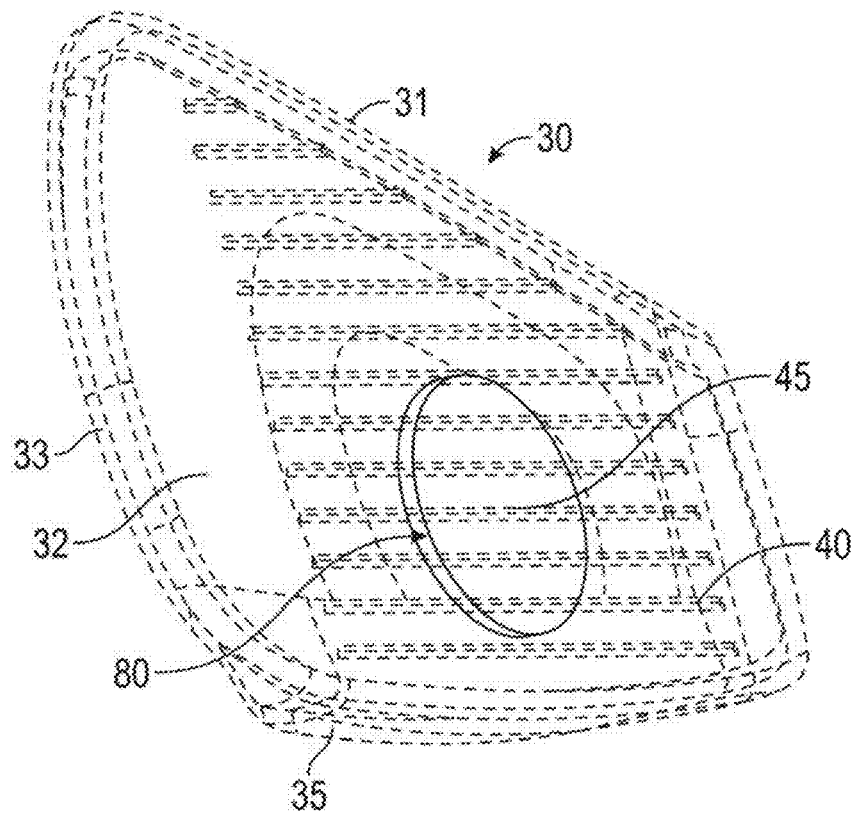

MIM can also be used to co-injection mold dissimilar materials and create elaborate thickness and weighting patterns in the face components 30 described above. In alternative embodiments, shown in FIGS. 5-8, a substructure 50 is co-molded via MIM to the rear surface 34 of the striking face 32. As shown in FIG. 5, the substructure 50 is a lattice extending across the entire rear surface 34 of the face component 30. In FIG. 6, the substructure 50 is a solid wall extending only across the lower third of the area of the rear surface 34, though it may in other embodiments cover the lower half of the rear surface 34 below the geometric center 45 of the striking face 32. In FIG. 7, the substructure 50 is composed of four quadrants 52, 54, 56, 58 covering upper toe 36, upper heel 37, lower toe 38, and lower heel regions 39 of the rear surface while leaving uncovered small areas around the geometric center of the rear surface and the vertical and horizontal axes 46, 48 extending through the geometric center 45. In FIG. 8, the substructure 50 is a circular piece centered around the geometric center 45 of the rear surface 34.

The substructure 50 preferably is composed of a titanium alloy, though in other embodiments it may be a higher density material such as tungsten alloy, while the rest of the face component 30 is composed of a steel material. This substructure 50 allows the manufacturer to fine-tune the coefficient of restitution (COR) across the striking face 32 while maintaining a high COR (preferably the USGA maximum) at the geometric center 45 of the striking face 32, and helps to decouple the COR values from the golf club head 10 center of gravity (CG). The substructure 50 preferably increases the COR at low, central regions of the striking face 32, in addition to the heel and toe regions.

Figure 9:
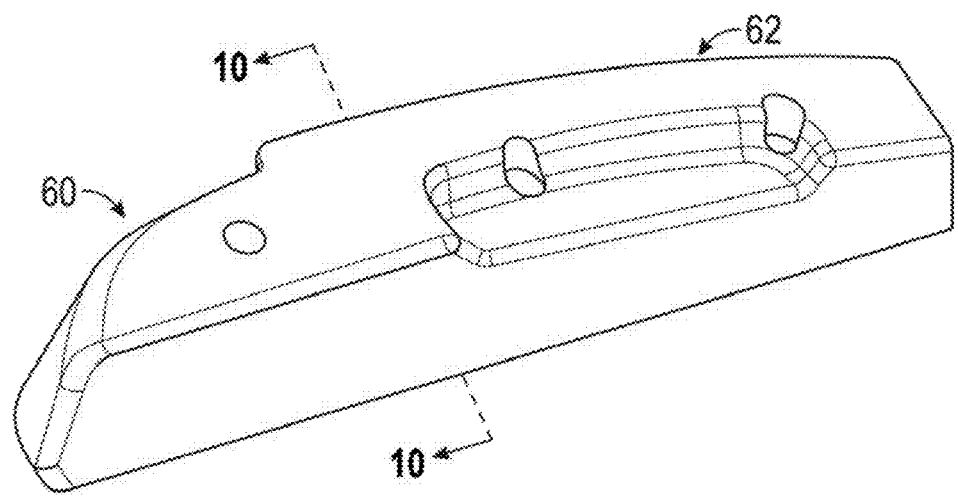
FIG. 9 is a side perspective view of an exemplary sole weight component manufactured according to MIM co-molding methods of the present invention.
Figure 10:
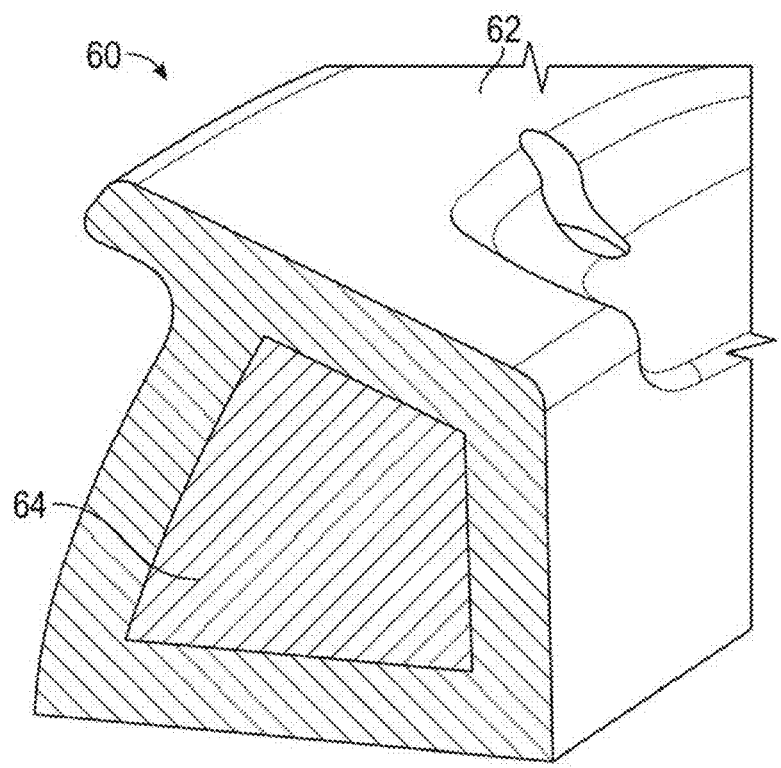
FIG. 10 is a cross-sectional view of the embodiment shown in FIG. 9 along lines 10-10.
Figure 11:
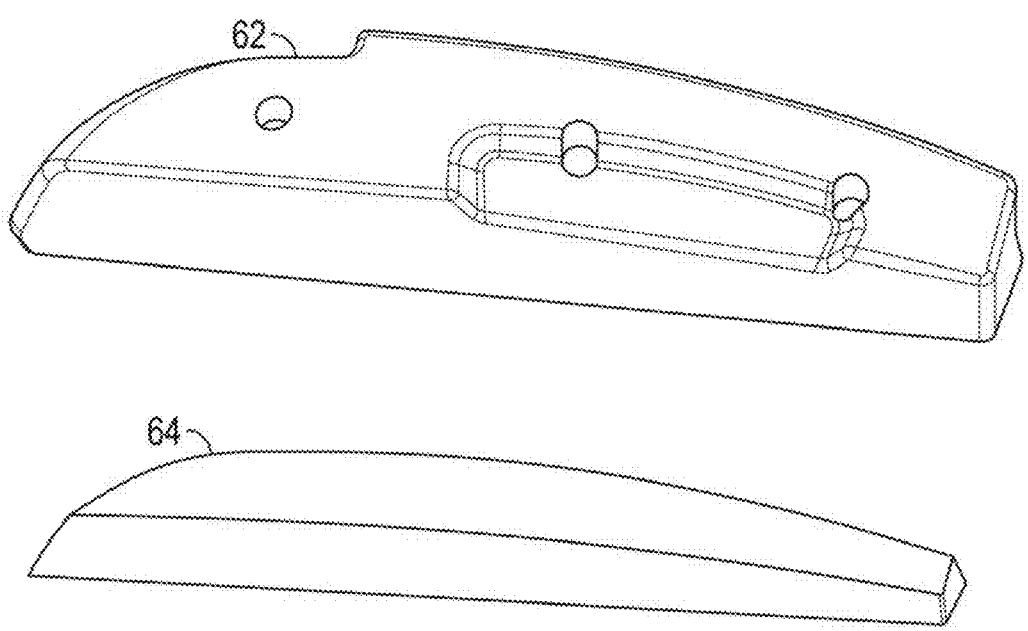
FIG. 11 is an exploded view of the embodiment shown in FIG. 9.
Figure 12:
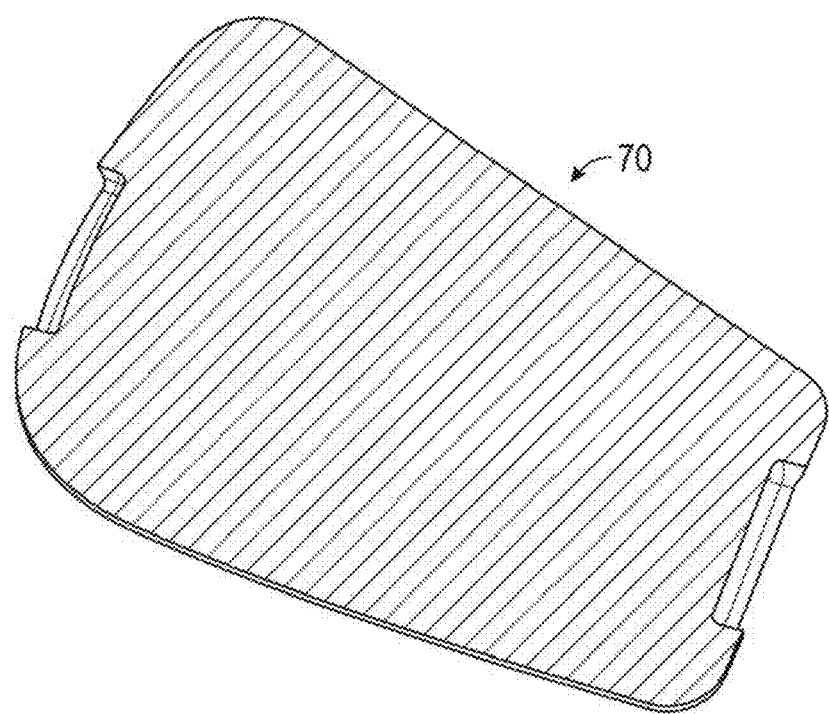
FIG. 12 is a rear perspective view of a high density weighting plate according to another embodiment of the present invention.
Figure 13:
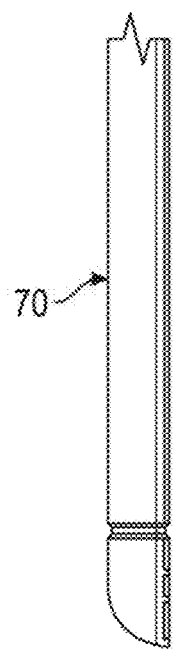
FIG. 13 is a side plan view of the embodiment shown in FIG. 12.
Figure 14:
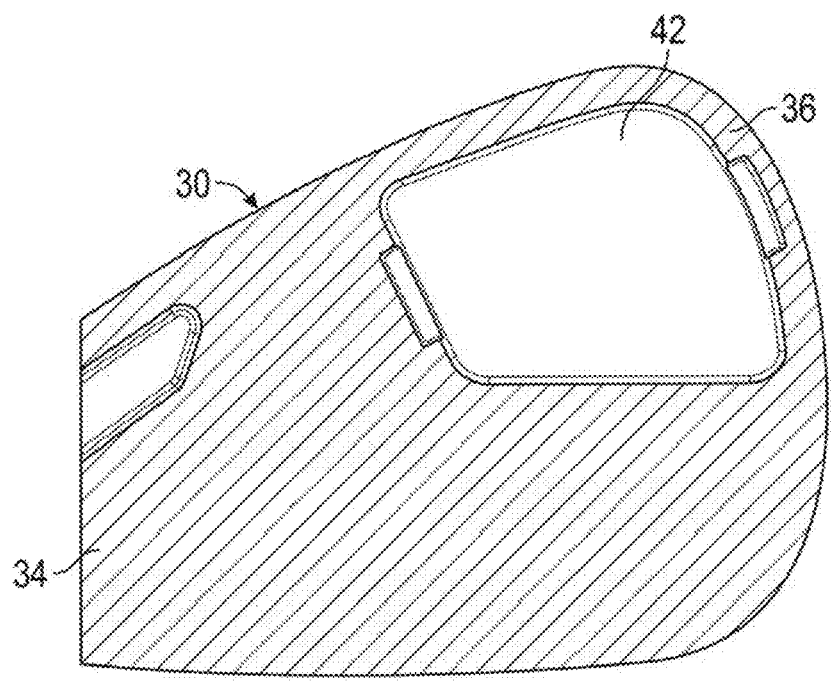
FIG. 14 is a rear plan view of an alternative face component according to the present invention.

In addition to its use in manufacturing high-performance face components 30, MIM co-molding can be used to combine dissimilar materials in other, more highly weighted areas of the iron-type golf club head 10 of the present invention. For example, FIGS. 9-11 disclose a 17-4 stainless steel cover 62 that is co-molded around a tungsten alloy weight 64, forming a sole weight 60 and rendering secondary bonding or welding processes to assemble the weight unnecessary.

In yet another embodiment, shown in FIGS. 12-15, MIM is used to create a thin, high-density weighting plate 70 that is disposed within a shallow recess 42 in the upper toe region 36 of the rear surface 34 of the striking face 32. The plate 70 preferably has a thickness of less than 0.10 inch, and more preferably less than 0.075 inch, and a mass ranging from 10-25 grams, and is composed of a tungsten alloy material with a density of 16-18.5 g/cc, and preferably a density of 18-18.5 g/cc.

In each of the embodiments disclosed herein, the pieces of the golf club head 10 that are made of dissimilar materials preferably are affixed to one another via the process of electrical resistance welding (ERW). ERW has a fast lead time, consumes fewer materials than traditional welding, and results in a negligible weld bead between the parts being attached to one another, thus using up less discretionary mass within the golf club head. The ERW process creates a reliable electro-mechanical bond between the two components that is comparable to traditional welding in standard durability testing.

Figure 15:
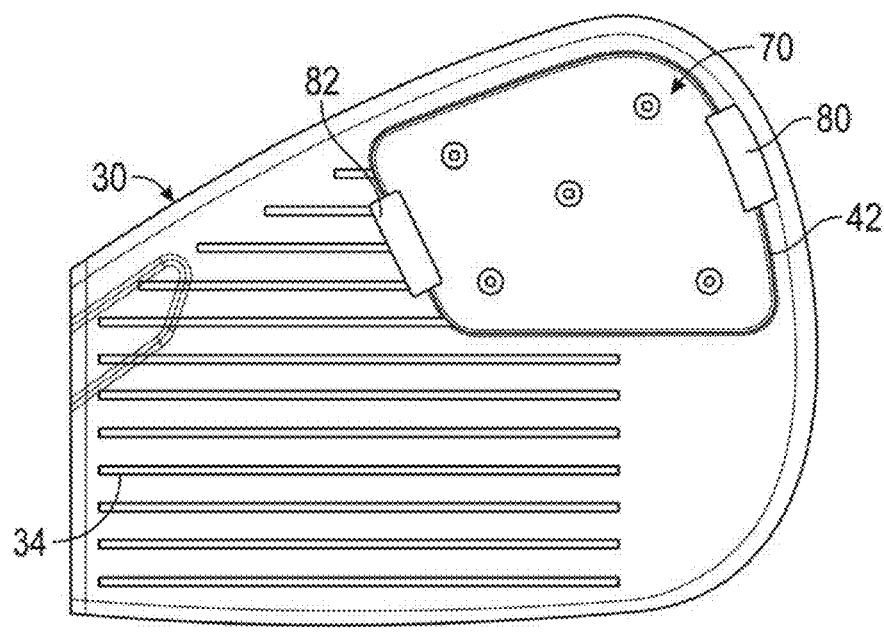
FIG. 15 is a rear plan view of the weighting plate shown in FIG. 15 engaged with the face component shown in FIG. 14.
Figure 16:
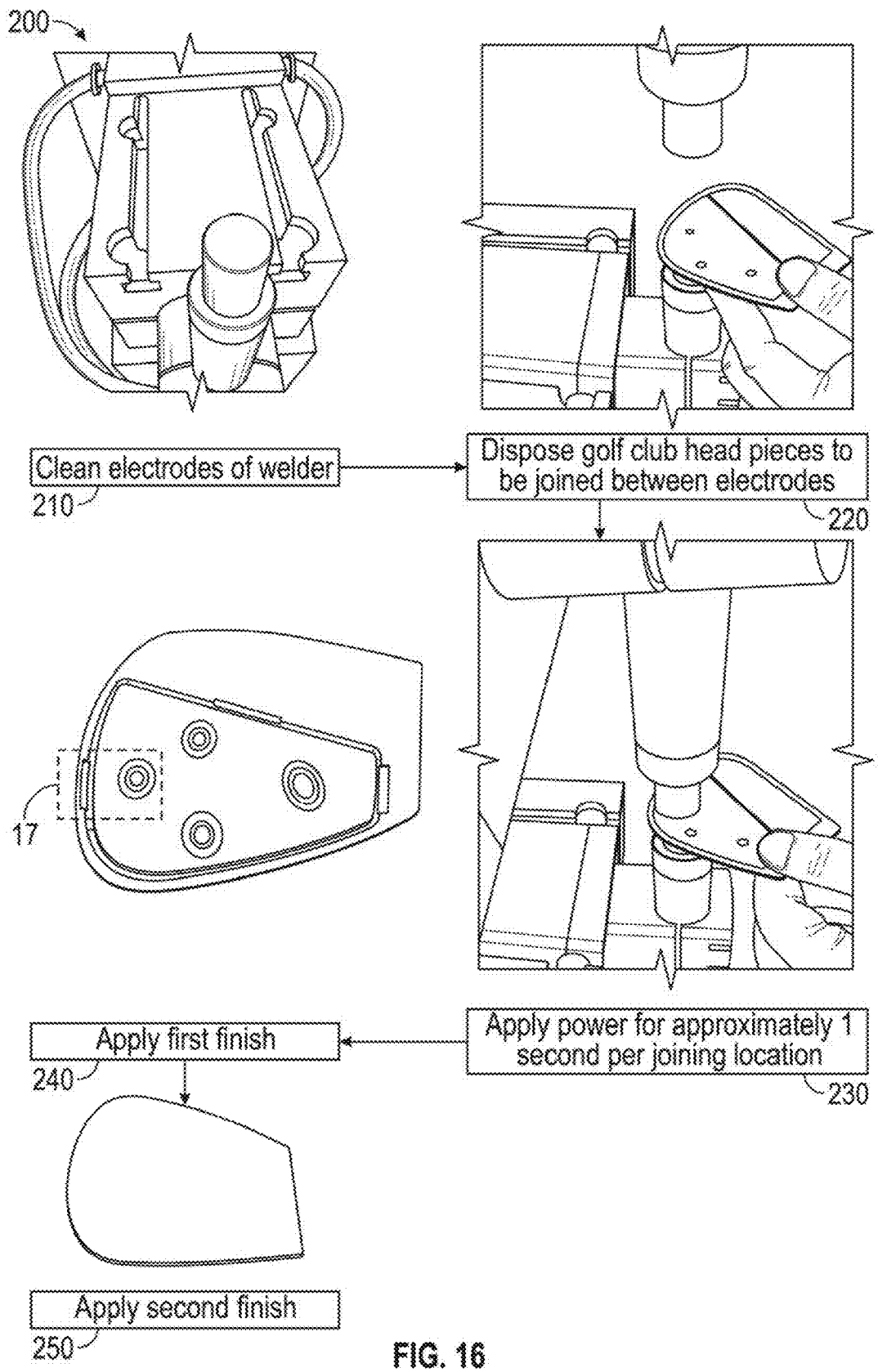
FIG. 16 is an illustrated flow chart describing a preferred method of electrical resistance welding pieces of a golf club head together according to the present invention.
Figure 17:
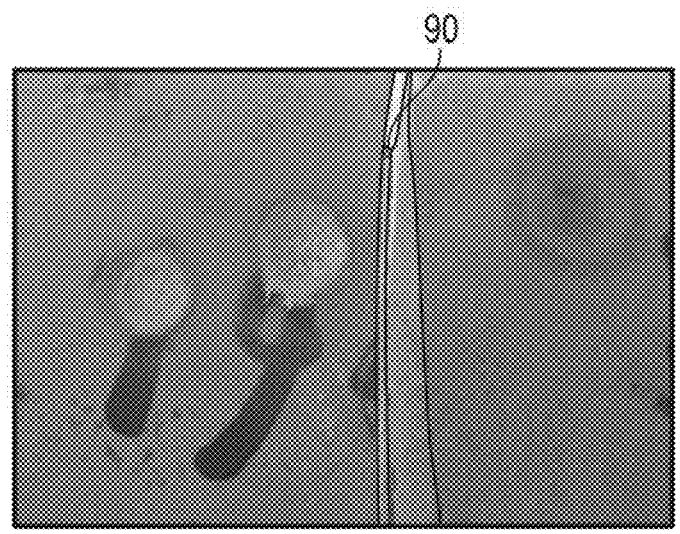
FIG. 17 is an enlarged view of the highlighted section of the illustrated method shown in FIG. 16.

For example, a preferred method for affixing the plate 70 and the face component 30 disclosed in FIGS. 12-15 to one another using ERW is illustrated in FIG. 16. As shown in FIG. 15, the plate 70 may be semi-permanently fixed to the face component 30 at one or more locations with tack welds 80, 82 to hold the plate 70 in place prior to applying the ERW process, but this step is optional. The preferred ERW method 200 comprises the steps of cleaning the electrode(s) of the welder 210, placing the golf club head pieces to be joined between the electrodes of the welder 220, applying power for approximately 1 second to each region of the golf club head to be joined 230, removing the golf club head and applying a first finish 240, and applying a second finish 250 to cover the small weld bead 90 created by the ERW process, an example of which (prior to the finishing steps 240, 250) is shown in FIG. 17.

Though the embodiments disclosed herein focus on iron-type golf club head manufacture, the methods and designs disclosed herein may be applied to any type of golf club head, including drivers, fairway woods, hybrids, wedges, utility irons, and putters.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. The section titles included herein also are not intended to be limiting. Therefore, the embodiments of the invention in which an exclusive property or privilege is claimed are defined in the following appended claims.

We claim:

1. A method comprising the steps of:
providing an electrical resistance welder comprising a pair of electrodes;
placing between the pair of electrodes a golf club head comprising a first piece composed of a metal material and a second piece composed of a metal material, wherein the first piece is at least partially disconnected from the second piece;
applying power to a plurality of regions of the golf club head so that at least one weld bead forms between the first and second pieces;
removing the golf club head from the electrical resistance welder; and
finishing the golf club head.

2. The method of claim 1, wherein the step of finishing the golf club head comprises the step of covering the weld bead.

3. The method of claim 1, further comprising the step of metal injection molding at least one of the first piece and the second piece, wherein the step of metal injection molding at least one of the first piece and the second piece occurs before the step of placing between the pair of electrodes the golf club head comprising the first piece and the second piece.

4. The method of claim 3, wherein the step of metal injection molding at least one of the first piece and the second piece comprises co-injection molding two different metal alloys.

* * * * *